US006763221B2

(12) United States Patent
Chandler

(10) Patent No.: US 6,763,221 B2
(45) Date of Patent: Jul. 13, 2004

(54) NETWORK MANAGEMENT SYSTEM ACCESS TO RADIO FREQUENCY OUTDOOR UNITS IN A POINT-TO-MULTIPOINT WIRELESS NETWORK

(75) Inventor: Joseph Chandler, Northampton, MA (US)

(73) Assignee: YDI Wireless, Inc., South Deerfield, MA (US)

( * ) Notice: Subject to any disclaimer, the term of this patent is extended or adjusted under 35 U.S.C. 154(b) by 698 days.

(21) Appl. No.: 09/803,726

(22) Filed: Mar. 9, 2001

(65) Prior Publication Data

US 2002/0128043 A1 Sep. 12, 2002

(51) Int. Cl.[7] .............................................. H04H 1/00
(52) U.S. Cl. ...................... 455/3.01; 455/313; 455/561
(58) Field of Search .............................. 455/561, 115.1, 455/155.2, 3.01, 313, 323, 132, 131, 500, 39, 501, 502, 507, 520, 526, 130, 426.2; 370/335, 342

(56) References Cited

U.S. PATENT DOCUMENTS

| 5,754,949 A | 5/1998 | Kumagai et al. ............ 455/115 |
| 5,987,060 A | 11/1999 | Grenon et al. .............. 375/213 |
| 6,665,279 B1 * | 12/2003 | Kwak et al. ................ 370/328 |
| 6,704,579 B2 * | 3/2004 | Woodhead et al. ......... 455/522 |
| 2002/0119797 A1 * | 8/2002 | Woodhead et al. ......... 455/522 |
| 2003/0152140 A1 * | 8/2003 | Antoniak .................... 375/219 |

* cited by examiner

*Primary Examiner*—Pablo N. Tran
(74) *Attorney, Agent, or Firm*—Hamilton, Brook, Smith & Reynolds, P.C.

(57) ABSTRACT

A system for providing network management access to RF outdoor units of a point-to-multipoint wireless network. Network management signals from a network management system (NMS) are transmitted from an outdoor unit (ODU) receiver to destination ODU transmitters via modulation of a low frequency carrier over a frequency reference interconnection carrying a frequency reference signal. The frequency of the carrier is lower than the frequency reference avoiding any interference between the signals.

10 Claims, 6 Drawing Sheets

| ELEMENT | WIRED IDU-ODU METHOD | | MODULATED IDU-ODU METHOD | |
|---|---|---|---|---|
| | FIG. 1A | FIG. 3 | FIG. 1B | FIG. 3 |
| IDU port terminations | 4 | 1 | 4 | 1 |
| IDU connectors | 4 | 1 | 0 | 0 |
| Cables | 4 | 1 | 0 | 0 |
| ODU connectors | 4 | 1 | 0 | 0 |
| ODU port terminations | 4 | 5 | 4 | 5 |
| Total | 20 | 9 | 8 | 6 |

FIG. 5

NETWORK MANAGEMENT SYSTEM ACCESS TO RADIO FREQUENCY OUTDOOR UNITS IN A POINT-TO-MULTIPOINT WIRELESS NETWORK

BACKGROUND OF THE INVENTION

The present invention relates to wireless communications, and in particular to a radio subsystem for providing Local Multipoint Distribution Service (LMDS).

The ever-increasing demand for high-speed access to data networks, such as the Internet, continues to drive the need for new technologies in the computer and electronics industry. As the present day wireline telephone network strains under the demands of both corporate and individual need for high speed connections, a new world of computer communications will eventually break down into two domains, fiber networks and wireless networks.

Fiber networks provide a potential capacity for communication which is a factor of a thousand or even a million times greater than currently used copper cabling, while also providing signaling that is far less susceptible to errors. Wireless networks implemented using broadband technologies, such as LMDS, offer high capacity local access to remote networks that is less capital-intensive and faster to deploy than wireline solutions.

Through recent Federal Communication Commission (FCC) spectrum auctions in the United States, and similar activities in other countries, wireless networks implemented using LMDS are now becoming a reality for the delivery of a wide range of communication services. A point-to-multipoint radio access system implemented with LMDS is capable of providing services ranging from voice to high-speed data (e.g., speeds from T-1 up to OC-3) and serving customers ranging from small to large businesses.

Depending on the country, LMDS uses high frequency microwave signals in the frequency spectrum of 24 GigaHertz (GHz) to 44 GHz and higher for sending and receiving data signals (voice, video, Internet, etc.) wirelessly between radio equipment deployed at a central hub location and distributed remote locations. The radio equipment at the remote location is referred to as the customer premise equipment (CPE) and is typically located at the homes and buildings of LMDS subscribers. The radio equipment at the central hub location is referred to as the hub or base station equipment and is typically located at a central hub tower. Each central hub tower can serve hundreds or thousands of LMDS subscribers within a particular region (i.e., sector or cell site), while a master head-end coordinates the hub signals and connects the LMDS network to other networks via an Internet gateway and/or through land line cabling.

In a typical LMDS configuration, the primary functional modules of base station equipment are separated into an indoor unit (IDU) and an outdoor unit (ODU). The IDU includes digital equipment for transmission and reception of LMDS-compatible intermediate frequency (IF) signals. The IDU also performs the conversion between computer data signals of baseband frequency and the corresponding IF data signals. The IF data signals are typically transmitted between the IDU and the ODU over a coaxial cable connection. The ODU includes outdoor-mounted microwave equipment for wireless transmission and reception of LMDS RF data signals. The ODU also performs the conversion between LMDS-compatible IF data signals and the corresponding LMDS RF data signals.

In more detail, data transmission over an LMDS network involves an IDU that modulates computer data signals of baseband frequency into LMDS-compatible intermediate frequency (IF) signals having a frequency in the range between 10 MegaHertz (MHz) and 2 GHz using an LMDS modem module. LMDS modems are not typically provisioned to modulate baseband computer data signals directly into RF data signals having frequencies in the LMDS frequency spectrum. Instead, a coaxial cable connection carries the IF data signals from the IDU to an ODU where an IF/RF millimeter wave radio circuit performs a radio frequency (RF) up-conversion on the IF signals. The RF up-conversion shifts the carrier frequency of the IF data signals resulting in RF data signals having a frequency in the LMDS RF frequency spectrum. The RF signals are then transmitted wirelessly from an antenna packaged with the ODU to the associated customer premise equipment (CPE).

Conversely, data reception involves the antenna of an ODU receiving RF data signals transmitted wirelessly from the associated CPEs. The IF/RF millimeter wave radio circuit of the ODU performs an RF down-conversion on the RF signals resulting in intermediate frequency (IF) data signals suitable for demodulation by an LMDS modem module of an IDU. The intermediate frequency (IF) signals are forwarded over a coaxial cable connection to the IDU that demodulates them into corresponding baseband frequency data signals suitable for transmission over a computer network. The computer data signals are then transmitted to the computer network via an internetwork device (e.g., switch or router) or to a stand-alone computer.

SUMMARY OF THE INVENTION

Base station equipment in an LMDS network is physically separated into functional modules called indoor units (IDUs) and outdoor units (ODUs). The physical separation allows IDUs to directly interface with a computer network making installation and troubleshooting easier for network technicians. Similarly, ODUs can be installed up on a rooftop, tower, or pole above surrounding obstacles minimizing any signal interference during wireless transmission of LMDS RF data signals along a desired line-of-sight (LOS) propagation path within a sector or cell.

However, the separation of the base station equipment into indoor units (IDUs) and outdoor units (ODUs) makes managing this radio subsystem more complex. Since IDUs are directly connected to a computer network or stand-alone computer, IDUs can be easily managed from a network management system (NMS) server as another network device or end node. In contrast, however, ODUs are not directly connected to the network or stand-alone computer. Therefore, an NMS server indirectly manages an ODU through a communication path between an IDU coupled to the ODU.

Current deployment techniques involve complex and expensive cabling configurations in order to provide network management access to ODUs. In particular, common cabling configurations require direct cable connections capable of carrying network management signals between one or more IDUs and each ODU.

NMS servers provide the ability of managing and configuring devices through software. In the context of an LMDS wireless network, NMS servers are capable of obtaining status and telemetry information as well as providing command and control operation of base station IDUs and ODUs. An NMS server may be located on a computer network or may be a stand-alone computer. There may also be more than one NMS server on a computer network. NMS servers communicate with all of the equipment through the transmission of network management signals that implement a variety of proprietary and public management protocols, commonly SNMP. One or more IDUs typically serve as the interface for transmitting the network management signals between the NMS server and the ODUs.

FIG. 1A is a block diagram illustrating a common cabling configuration for providing network management access to ODUs. IDUs are omitted in FIG. 1A for purposes of clarity. The base station equipment 100 includes four ODUs, one ODU receiver 30 and three ODU transmitters 35-1, 35-2, and 35-3 (collectively referred to as the ODU transmitters 35). Each ODU 30 and 35 is coupled to an IDU via a power/data connection 25-1, 25-2, 25-3, and 25-4 (collectively referred to as the power/data connections 25) supplying DC power and carrying IF data signals. The power/data connections 25 are typically coaxial cables.

In addition to the power/data connections 25, each ODU 30 and 35 is coupled to a separate network management connection 27-1, 27-2, 27-3, and 27-4 (collectively referred to as the network management connections 27) that extends from one or more IDUs. The network management connections 27 are typically multi-conductor shielded cables. An NMS server (not shown in FIG. 1A) communicates with a particular ODU by transmitting network management signals over a network management connection 27 that couples an IDU to the ODU being managed.

In addition to having separate cabling connections for network management purposes, this cabling configuration requires additional network management connectors and port termination circuitry (not shown in FIG. 1A) at both the IDU and ODU ends adding to the overall time and cost of installation at a customer site. Furthermore, the existence of an additional connector in each ODU 30 and 35 presents another opening to seal for weatherproofing as well as another path for electrical surges (e.g., lightning) to potentially damage the unit.

FIG. 1B is a block diagram illustrating another common cabling configuration for providing network management access to ODUs. Regarding the base station equipment 200, there is no separate network management connection as in FIG. 1A. Instead, network management signals to and from each ODU are modulated over a low frequency carrier and multiplexed with the DC power and IF data signals on the power/data connections 25-1, 25-2, 25-3, and 25-4 (collectively referred to as the power/data connections 25). In this cabling configuration, network management signals are still transmitted directly from an IDU to each ODU being managed. The difference from FIG. 1A is that the network management signals are modulated over the power/data connections 25 rather than utilizing a separate network management connection to each ODU.

Although this configuration eliminates extra cabling and connectors dedicated for network management and avoids additional susceptibility to leaks and lightning, every IDU/ODU interconnection must still provide intermediate frequency (IF) data, DC power and NMS interface elements. Furthermore, in some cases more than one IDU device will be connected to a single ODU or the converse may be true. Management of such configurations is particularly complex for high capacity sites or sites capable of scaling to high capacity, which have increasing numbers of ODU transmitters. Such configurations become overly complex to effectively manage each ODU.

Embodiments of the present invention address these issues encountered in the actual deployment of LMDS or similar base station equipment. Embodiments of the present invention include a system for providing network management access to radio frequency (RF) outdoor units of base station equipment in a point-to-multipoint wireless network. This embodiment includes an RF outdoor unit (ODU) receiver, one or more RF outdoor unit (ODU) transmitters, and a frequency reference interconnection carrying a master frequency reference signal from the receiver to the transmitters. A network management signal destined for an ODU transmitter is modulated onto a low frequency carrier, which is duplexed with the master frequency reference signal and transmitted over the frequency reference interconnection for transmission from the receiver to the transmitter. Implementing either a public or proprietary management protocol, the network management signal is used for management and configuration of RF ODU receivers and transmitters. The low frequency carrier typically has a frequency lower than the frequency of the reference signal. Various digital modulation techniques may be utilized to modulate the network management signal onto the low frequency carrier including on-off keying, frequency shift keying, and dual tone multi-frequency.

The system for providing network management access to ODUs also includes an indoor unit (IDU). According to one embodiment, a network management connection couples the IDU to the ODU receiver and carries the network management signal from the IDU to the ODU receiver. Alternatively, a network management signal is transmitted from the IDU to the ODU receiver through a power/data connection that also couples the IDU to the ODU receiver. In particular, the network management signal is modulated onto another low frequency carrier. The modulated low frequency carrier is then multiplexed with the power and IF data signals over the same power/data connection from the IDU to the ODU receiver. The wireless network may implement a number of broadband technologies including LMDS.

BRIEF DESCRIPTION OF THE DRAWINGS

FIG. 5 is a table providing a quantitative comparison of the number of hardware elements dedicated to the network management function for each configuration as illustrated in FIGS. 1A, 1B, and 2–3.

Figure 1A:
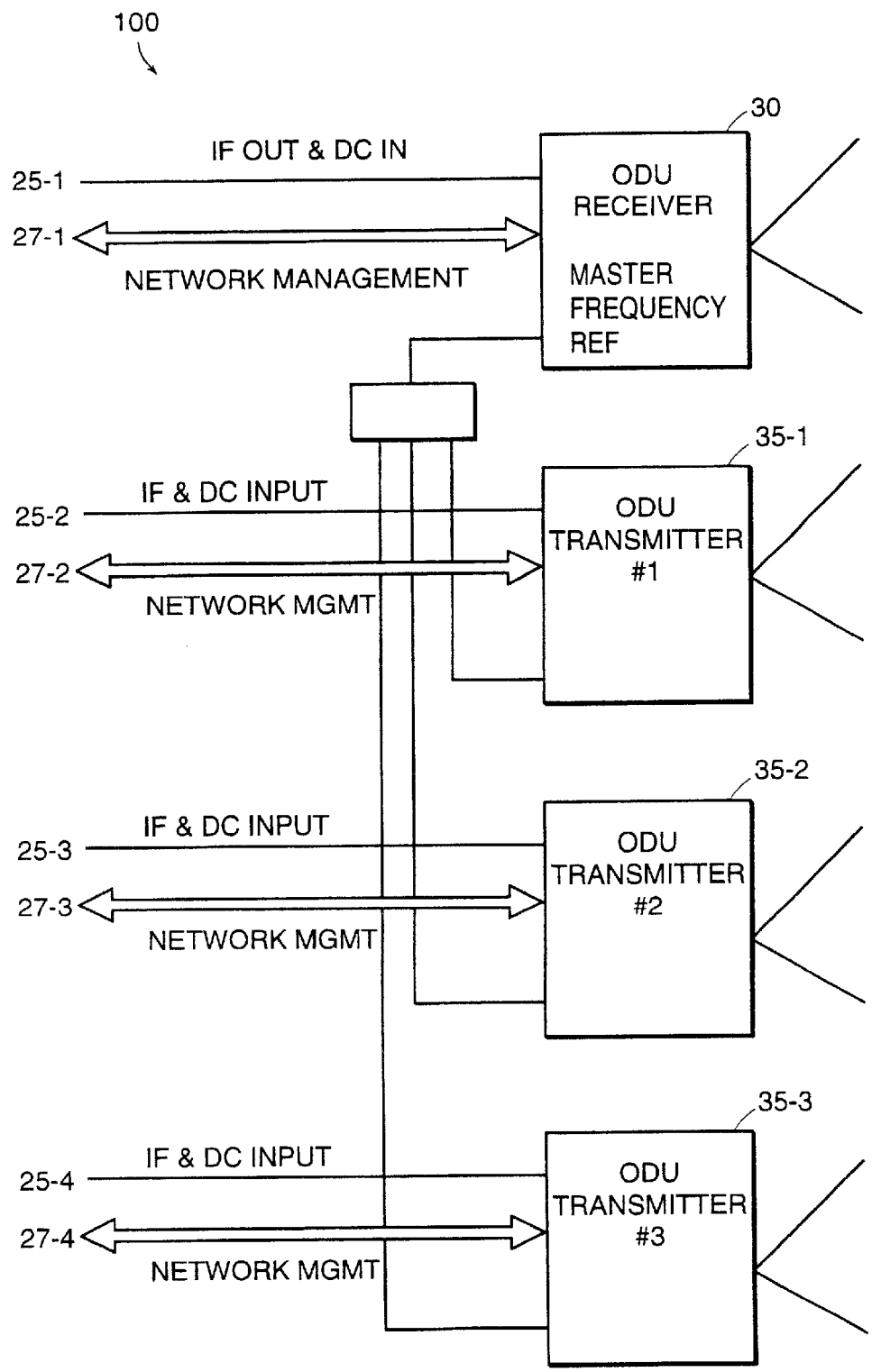
FIG. 1A is a block diagram illustrating a common cabling configuration providing network management access to an ODUs.
Figure 1B:
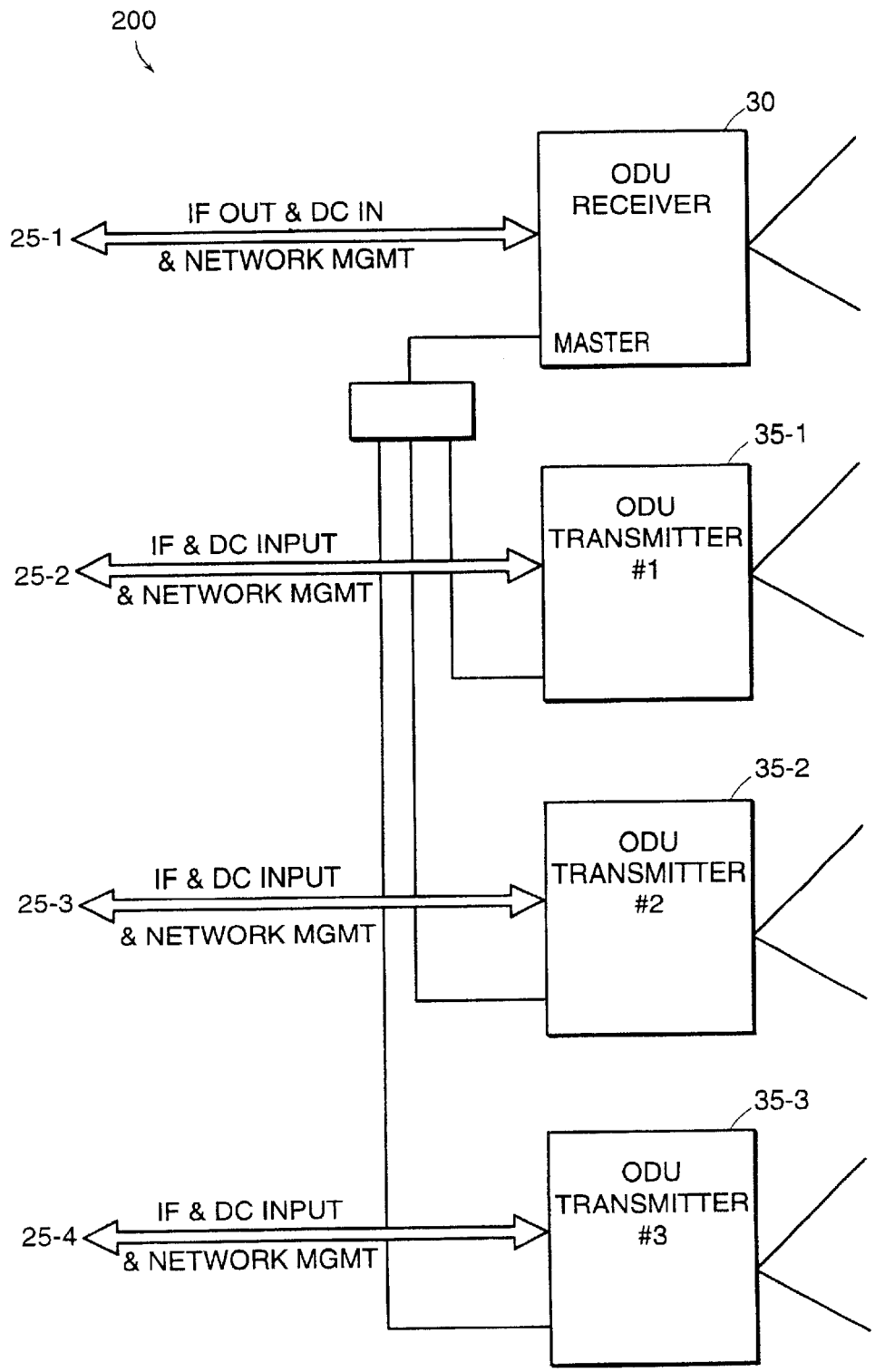
FIG. 1B is a block diagram illustrating another common cabling configuration for providing network management access to ODUs.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Embodiments of the invention provide a network management system (NMS) server with access to radio frequency (RF) outdoor units (ODUs) at the base station equipment in a point-to-multipoint wireless network minimizing the complexity of installation. In particular, a network management communication path is provided to ODU transmitters via an ODU receiver utilizing a modulated low frequency carrier multiplexed with the master frequency reference on the same interconnection. Embodiments of the invention apply to deployments that utilize separate ODUs for receiving and transmitting RF data signals over a wireless network using broadband technologies, such as LMDS. In addition, an ODU receiver must be coupled to one or more ODU transmitters providing a master frequency reference signal. The master frequency reference signal may be a low phase noise signal for maintaining synchronous operation between the ODU receiver and transmitters. The frequency reference signal typically has a frequency between the range of 50 and 150 MegaHertz (MHz).

Figure 2:
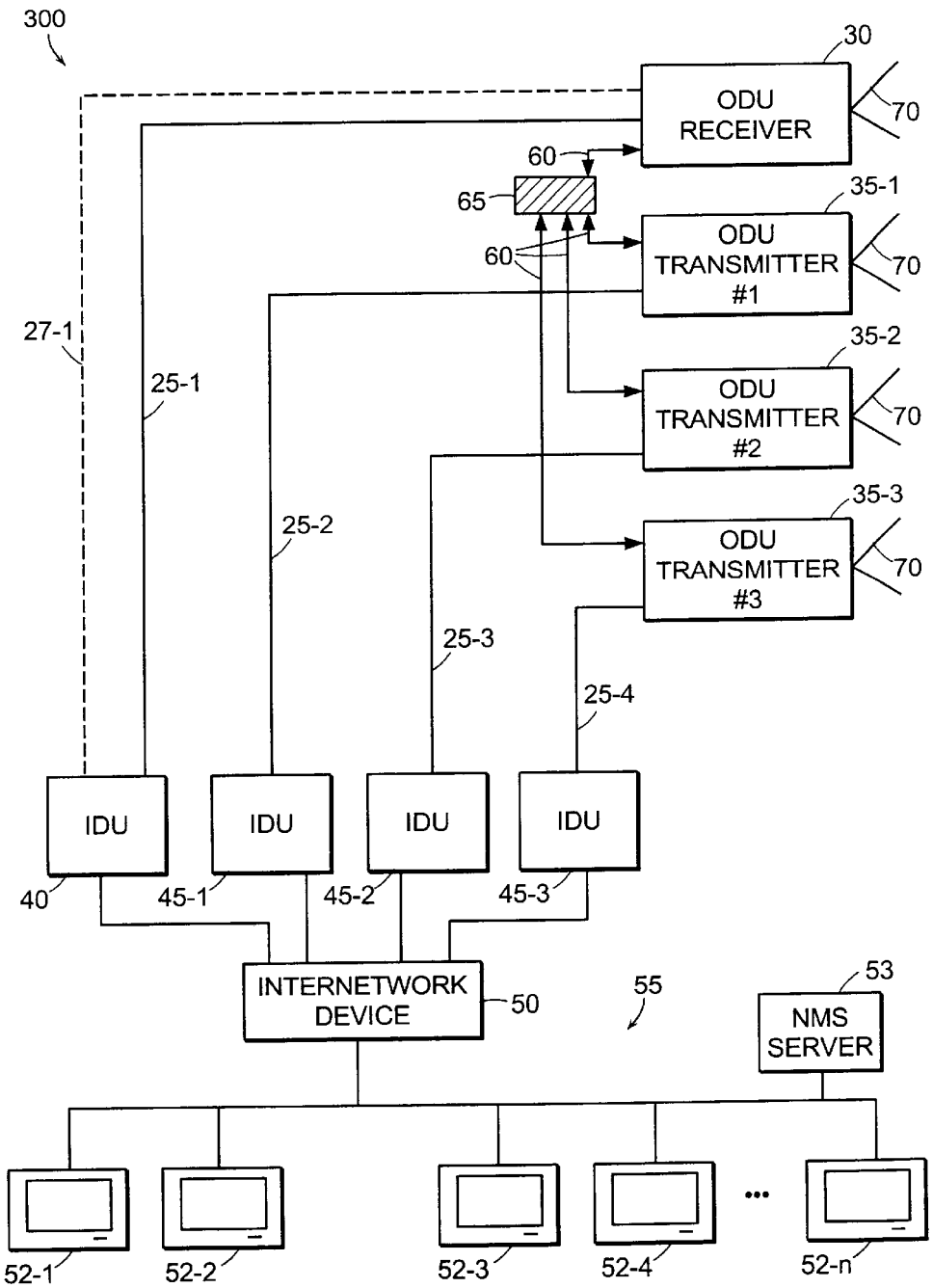
FIG. 2 is a block diagram of customer premise equipment (CPE) in a wireless network according to one embodiment of the present invention.

FIG. 2 is a block diagram of base station equipment in a wireless network according to one embodiment of the present invention. In brief overview, the base station equipment 300 includes an IDU receiver 40, and three IDU transmitters 45-1, 45-2, and 45-3 (collectively referred to as the IDU transmitters 45) coupled to an ODU receiver 30, and three ODU transmitters 35-1, 35-2, and 35-3 (collectively referred to as the ODU transmitters 35) respectively. Other configurations are possible. For example, another configuration may only couple one IDU to the ODU receiver 30 and transmitters 35. Alternatively, more than one IDU may be coupled to any single ODU for redundancy or sharing of ODU resources. Furthermore, the number of ODU receivers and transmitters are variable depending on particular bandwidth requirements.

Power distribution circuits (not shown) in the IDUs 40 and 45 generate and supply DC power to the ODUs 30 and 35 over power/data connections 25-1, 25-2, 25-3, and 25-4 (collectively referred to as power/data connections 25). The power/data connections 25 also carry intermediate frequency (IF) data signals between IDUs 40, 45 and their corresponding ODUs 30, 35. In particular, the IF data signals generated and received by LMDS modem modules (not shown) in IDUs 40 and 45. Thus, power and data are duplexed over the same connection. The coupling of the IDUs 40 and 45 to the ODUs 30 and 35 is described later in more detail with respect to FIG. 3.

In base station deployments having separate ODU receivers and transmitters, a frequency reference interconnection 60 is required. The frequency reference interconnection 60, such as a coaxial cable, couples an ODU receiver 30 to the ODU transmitters 35. The frequency reference interconnection 60 carries a master frequency reference signal from the ODU receiver 30 that is used as a clocking signal for maintaining synchronous operation between the ODU receiver 30 and transmitters 35. The master frequency reference signal may be a low phase noise signal for maintaining synchronous operation between the ODU receiver and transmitters. The frequency reference signal typically has a frequency between the range of 50 and 150 MHz. Where there is more than one ODU transmitter, a cable splitter 65 may be utilized to split the master frequency reference signal to each of the ODU transmitters 35.

The IDUs 40 and 45 are coupled to a data network 55 via an internetwork device 50. The internetwork device 50 may be a router, switch, gateway or other computer networking equipment providing data signal connections to one or more computers 52-1, 52-2, . . . 52-n (collectively referred to as 52). In an alternative embodiment, a single computer may be directly connected to the IDU, such as in an application where LMDS service is to be provided only to a single computer. Still other data network interconnection arrangements are possible limited only by the various ways in which computer networks can be constructed.

A network management system (NMS) server 53 provides the ability of managing and configuring devices through software. In the context of an LMDS wireless network, an NMS server 53 is capable of obtaining status and telemetry information as well as providing command and control operation of base station IDUs 40 and 45 and ODUs 30 and 35. A NMS server 53 may be located on a computer network 55 or may be a stand-alone computer. There may also be more than one NMS server 53 on a computer network. An NMS server 53 communicates with the base station equipment 300 through the transmission of network management signals implementing a variety of proprietary and public management protocols, commonly SNMP. According to one embodiment, the network management signals destined for one or more of the ODUs 30 and 35 are transmitted to the IDU receiver 40, which interfaces with the ODU receiver 30. The ODU receiver 30 provides a communication path to the ODU transmitters 35 via the frequency reference interconnection 60; thus eliminating the need to maintain separate network management connections from an IDU to each ODU.

Figure 3:
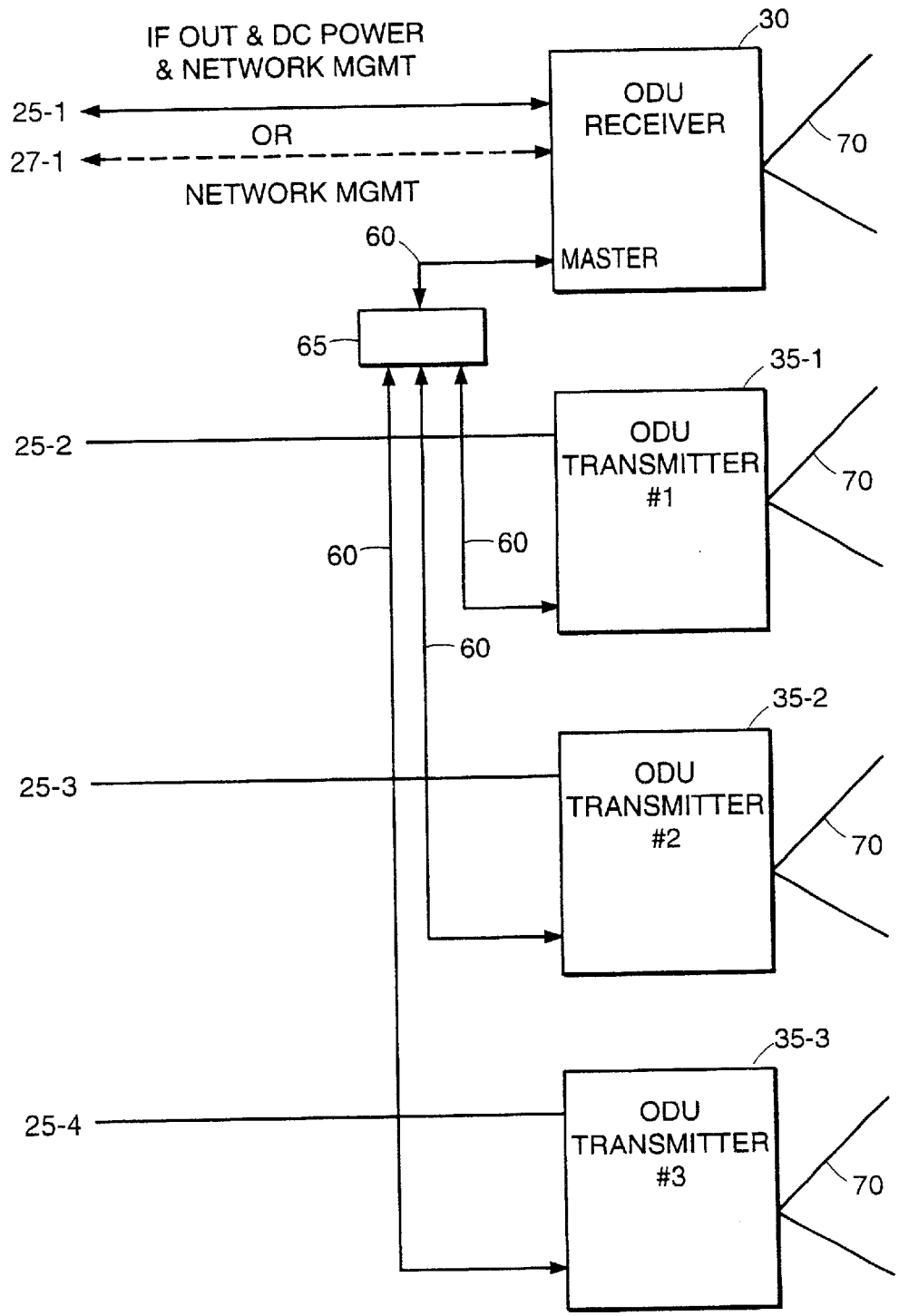
FIG. 3 is a block diagram corresponding to FIG. 2 and further illustrating a configuration for providing network management access to an ODU according to an embodiment.

FIG. 3 is a block diagram corresponding to FIG. 2 and further illustrating a configuration for providing network management access to an ODU according to an embodiment. In brief overview, the ODU receiver 30 transmits the network management signals destined for one or more of the ODU transmitters 35 over the frequency reference interconnection 60 via modulation of a low frequency carrier.

Network management signals may be communicated to and from the ODU receiver 30 in many possible ways. In one embodiment, network management signals are transmitted directly between IDU 40 and ODU receiver 30 by a network management connection 27-1, such as a multi-conductor shielded cable, which is physically separate from the power/data connection 25-1.

Alternatively, network management signals may be modulated over a low frequency carrier and multiplexed with the IF data signals and DC power over the same power/data connection 25-1. In this alternative embodiment, the frequency of the carrier may be 1.0 MHz which is adequate isolation from DC and significantly lower than IF frequencies. Furthermore, modulation of the low frequency carrier may be implemented by utilizing On-Off Keying (OOK), dual tone multi-frequency (DTMF), or frequency shift keying (FSK). In either embodiment, the network management signals for managing and configuring the group of ODUs 30 and 35 initially terminate at the network management port circuitry of ODU receiver 30.

Communication between the ODU receiver 30 and the IDU 40 may be in half duplex mode such that it is bi-directional but only one end transmits at a time. Network management signaling between the ODU receiver 30 and the IDU 40 may operate at 9600 baud in the case where carrier present corresponds to a logical "0". A simple narrowband threshold detector at each end provides a direct RF to digital conversion. Such circuitry is identical at each end with design and construction of such circuitry being known by those skilled in the art.

Network management signals destined for one or more of the ODU transmitters 35 are then modulated onto a low frequency carrier, such as a 1.0 MHz carrier, that is duplexed with the master frequency reference signal from the ODU receiver 30 via the frequency reference interconnect 60. Thus, the ODU transmitters 35 receive a common network management signal over the frequency reference interconnection 60.

A 1.0 MHz frequency carrier for modulating the network management signals allows the maintenance of a high level of isolation, because it is significantly lower than the typical 100 MHz frequency reference signal. The utilization of a 1.0 MHz frequency carrier does not exhibit any appreciable loss through the frequency reference interconnection 60 which is designed for minimum loss at IF frequencies. On-Off Keying (OOK), dual tone multi-frequency (DTMF), or frequency shift keying (FSK) may accomplish modulation of the low frequency carrier.

Figure 4:
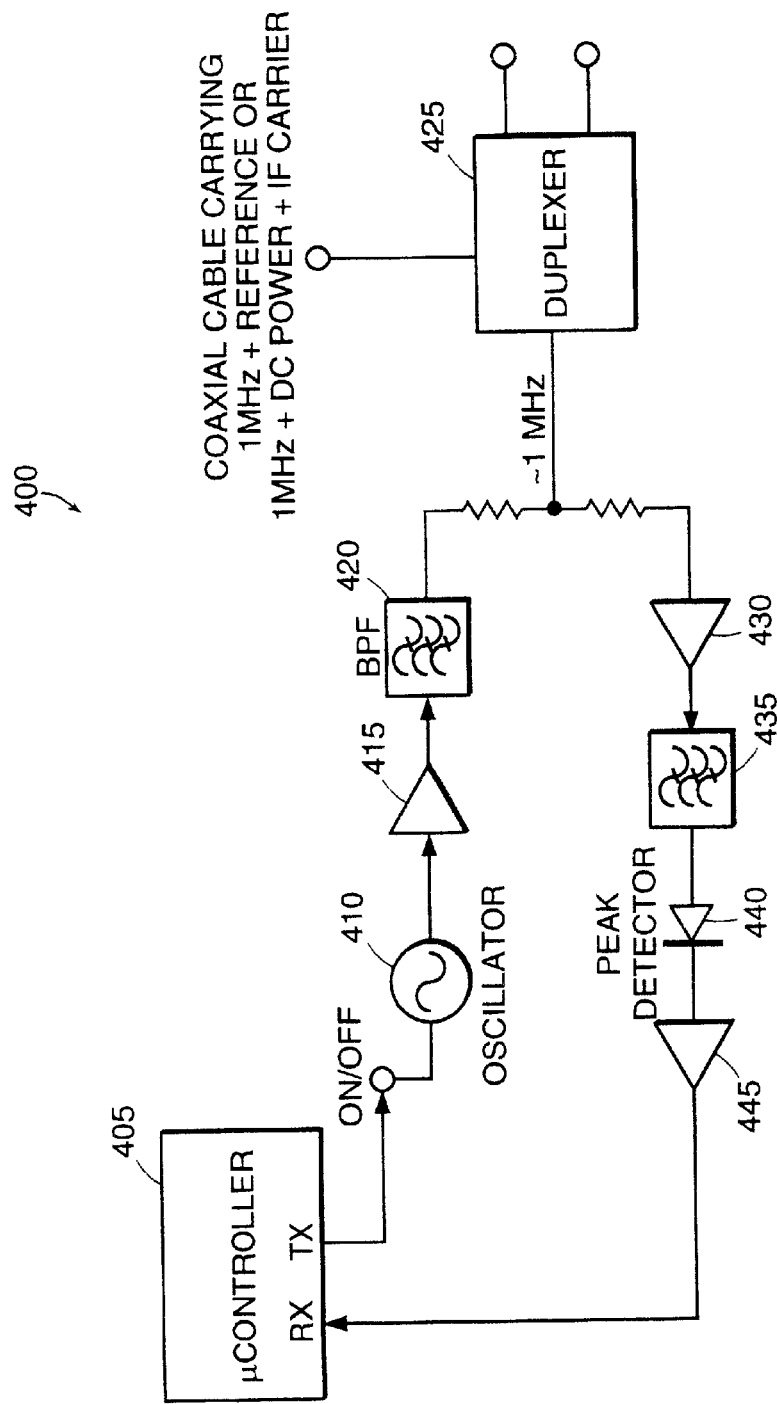
FIG. 4 is a circuit diagram illustrating the circuitry for providing a communication path for network management signals over a frequency reference interconnection according to one embodiment.

FIG. 4 is a circuit diagram illustrating the circuitry for providing a communication path for network management signals over a frequency reference interconnection according to one embodiment. This approach is half duplex in that it allows for both transmission and reception over the same wire at the same frequency but not simultaneously. The circuitry is identical at the ODU receiver and at an ODU transmitter.

Network management signals are transmitted from microcontroller 405 as a binary datastream. Through On/Off Keying, the binary datastream is converted into an analog datastream by a signal oscillator 410. In particular, the signal oscillator 410 generates a low frequency carrier (e.g., 1.0 MHz), which is modulated by the binary datastream. Logical zeros in the modulated frequency carrier are represented with zero amplitudes, while logical ones are represented with non-zero amplitudes. The signal is amplified through an RF amplifier 415 and passes through a band pass filter (BPF) 420 filtering out any extraneous signal noise. The modulated carrier propagating the network management signals passes through the duplexer 425, which duplexes the carrier signal with the frequency reference signal over the same frequency reference interconnection 60 to the ODU transmitters.

At an identical circuit on the other end of the frequency reference interconnection 60, the modulated carrier signal is received by a duplexer 425. The modulated low frequency carrier is transmitted from the duplexer 425 to an RF amplifier 430 and then through a band pass filter 435 filtering out any signal noise. The output of the band pass filter 435 is an analog representation of the binary datastream. A peak detector 440 processes the modulated carrier signal outputting a binary datastream (e.g., square waves). The binary datastream passes through an amplifier, such as a comparitor amplifier, which brings the voltage level of the binary datastream to TTL or CMOS logic levels appropriate for reception by the microcontroller 405.

FIG. 5 is a table providing a quantitative comparison of the number of hardware elements dedicated to the network management function for each configuration as illustrated in FIGS. 1A, 1B, and 2–3. A cabling configuration utilizing the frequency reference interconnection 60 reduces the number of network management connectors, port terminations, and cables at the both the IDU and ODU ends. As the number of associated ODU transmitters changes, the number of hardware elements in FIG. 1B will increase or decrease by two for each transmitter. With respect to FIG. 3, the number of hardware elements will increase or decrease that number by only 1. This cabling configuration also simplifies the implementation of the NMS server software since the network management signaling is routed directed to only one IDU serving as the network management interface for a number of ODU receivers and transmitters.

This simplification is important because the number of ODUs and IDUs is uncorrelated beyond a minimum configuration. Each IDU has at least one receive port and at least one transmit port. Typically, one ODU Receiver can support virtually any number of IDUs provided they are all assigned to the same cell or sector. The number of IDUs per ODU transmitter is finite and can vary from a single IDU transmit port for each ODU transmitter to several IDU ports combining to a single ODU transmitter.

In the first case where all NMS connections are wired, it becomes very complex and uncertain how to optimally make the interconnections and the subsequent assigned paths for NMS access. In the second case where a modulated NMS connection is required for each ODU, all IDU ports must be provisioned with the modulated interface. Depending on the overall interconnect plan, many of the modulated interfaces are disabled and not used.

Embodiments of the present invention greatly simplify this problem by diminishing the transmit ports from the task. For the first case, a single wired connection per ODU is necessary versus a separate multiplexer. For the second case, the modulated interface can be eliminated from all transmit ports.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for providing network management access to radio frequency (RF) outdoor units (ODUs) of base station equipment in a point-to-multipoint wireless network, comprising:

an RF outdoor unit receiver;

at least one RF outdoor unit transmitter;

a frequency reference interconnection between the receiver and the at least one transmitter, the interconnection carrying a master frequency reference from the receiver; and a network management communication path to the transmitters via the receiver modulating network management signals on a frequency carrier multiplexed with the master frequency reference on the frequency reference interconnection.

2. The system of claim 1, further comprising:

a circuit for modulating the network management signals onto the frequency carrier and multiplexing the modulated frequency carrier with the master frequency reference on the frequency reference interconnection, the outdoor unit receiver and the at least one outdoor unit transmitter comprising the circuit.

3. The system of claim 2, wherein the circuit comprises:

a microcontroller, the microcontroller transmitting and receiving the network management signals;

an oscillator, the oscillator generating the frequency carrier modulated by the network management signals;

a duplexer, the duplexer multiplexing and transmitting the modulated frequency carrier with the master frequency reference over the frequency reference interconnection, the duplexer receiving the modulated frequency carrier; and a peak detector, the peak detector generating the network management signals from the modulated frequency carrier.

4. The system of claim 1 wherein the frequency carrier has a frequency lower than the frequency of the frequency reference signal.

5. The system of claim 1 wherein modulation of the frequency carrier is implemented by one of the digital modulation techniques from the group consisting of on-off keying, frequency shift keying, and dual tone multi-frequency.

6. The system of claim 1 wherein the network management signal implements either a public or proprietary management protocol, the network management signals being used for management and configuration of radio frequency outdoor unit receivers and transmitters.

7. The system of claim 1 wherein the wireless network is an LMDS point-to-multipoint wireless network.

8. The system of claim 1, further comprising:
   an indoor unit; and
   a network management connection coupling the indoor unit to the receiver, the network management connection carrying the network management signal from the indoor unit to the receiver.

9. The system of claim 1 further comprising:
   an indoor unit;
   a power/data connection coupling the indoor unit to the outdoor unit receiver, the power/data connection carrying power and intermediate frequency (IF) data signals;
   the network management signal being modulated onto a second low frequency carrier, the second modulated low frequency carrier being multiplexed with the power and IF data signals from the indoor unit to the receiver.

10. A system for providing network management access to radio frequency (RF) outdoor units of customer premise equipment in a point-to-multipoint wireless network, comprising:
   an RF outdoor unit receiver;
   a plurality of RF outdoor unit transmitters;
   a frequency reference interconnection carrying a master frequency reference signal from the receiver to the transmitters; and
   a network management signal destined for the one or more of the transmitters being modulated onto a low frequency carrier, the modulated low frequency carrier being multiplexed with the master frequency reference signal and transmitted over the frequency reference interconnection for transmission from the receiver to the transmitters.

* * * * *